United States Patent Office 3,350,440
Patented Oct. 31, 1967

3,350,440
HIGH-ENERGY PROPELLANT OXIDIZER AND METHOD FOR SYNTHESIS
Perry A. Argabright, Cranford, and Lawrence J. Engel, Dunellen, N.J., assignors to Esso Research and Engineering Company, a corporation of Delaware
No Drawing. Filed Dec. 11, 1961, Ser. No. 159,478
3 Claims. (Cl. 260—490)

This invention relates to the synthesis of tetrakis-(difluoramino)-1-acetoxybutane, which is a new product useful in the solid rocket propellant art. This product is a high-energy fluorine oxidizer in that it contains one $NF_2$ group attached to each of the carbons in the substituted butane or butyl radical. This product is also useful as a plasticizer for high-energy binders and as an intermediate for making reactive monomers that can be polymerized to high-energy binders or coupled to form high-energy binders with other ingredients.

The starting material, termed 1-acetoxy-1,3-butadiene, is represented by the following formula:

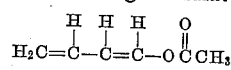

This diolefinic acetate is a known available material which may be obtained by reaction of ketene, $CH_2=CO$, with crotonaldehyde, $CH_3CH=CHCHO$.

After initial efforts to make the tetrakis-$(NF_2)$ adduct of the acetoxybutadiene had failed, the tetrakis-$(NF_2)$ adduct desired was unexpectedly achieved by use of the method which will be described. In the initial efforts to react the butadiene acetate with $N_2F_4$, it appeared that only certain bis-$(NF_2)$ adducts could be obtained. However, it was then found, in accordance with the present invention, that by removing decomposition products of $N_2F_4$ formed at higher temperatures and then by recharging with fresh $N_2F_4$, the reaction could be made to proceed to complete conversion to the tetrakis adduct which may be termed tetrakis-(difluoramino)-butylacetate or tetrakis-(difluoramino)-1-acetoxybutane.

Two varieties of procedure for preparing the tetrakis-$(NF_2)$ derivative of 1-acetoxy-1,3-butadiene were used. In the first of these, the bis-$(NF_2)$ adduct is formed in an initial vapor-phase reaction stage, after which the bis adduct from the first stage is subjected to reaction with fresh $N_2F_4$ under increased pressure and with liquid diluent.

In the second procedure, the 1-acetoxy-1,3-butadiene reactant is subjected to reaction with $N_2F_4$ under high pressure in the presence of liquid diluent at the beginning, then the reaction temperature is increased and fresh $N_2F_4$ is charged to replace decomposition products of the initial $N_2F_4$ charge.

By using the mode of procedure in which a vapor-phase reaction is conducted as a first stage, there is the advantage of employing steps that increase the rate of reaction in a homogeneous vapor-phase system, and a continuous flow-type reaction may be used. The second mode of procedure has the advantage of using a single reaction zone or single reactor, such as a stainless steel pressure bomb, and in using higher concentrations of reactants from the beginning of the reaction. To control the reaction so as to avoid hazard of explosion, the beginning of the reaction toward the formation of bis-$(NF_2)$ adduct is made to take place at a low temperature, such as 20° C. or room temperature, or in the range of —50° to +100° C. After this initial phase of reaction in which the bis adduct is formed, the reaction is made to take place under superatmospheric pressure, e.g. about 1 to 10 atmospheres or higher, and at temperatures in the range of about 50° to 250° C. The preferred conditions of reaction are set forth in the following examples on each of the two modes of procedure.

EXAMPLE 1

For the procedure in which an initial vapor-phase reaction is carried out, the acetoxybutadiene is mixed in vapor phase with gaseous $N_2F_4$ to form a mixture having a subatmospheric pressure at 25° C. The acetoxybutadiene reactant is preferably in a proportion of 1 mole to 2 moles of $N_2F_4$. If no inert gas is admixed, a higher proportion of $N_2F_4$ is used. With inert gas present, the proportion of $N_2F_4$ to the acetoxybutadiene may be lowered for producing the bis adduct at a reasonable rate. The bis adduct has a composition of approximately $C_6H_8O_2(NF_2)_2$. The bis-$(NF_2)$ adduct product from the vapor-phase stage is then reacted further in a higher pressure stage with an increased proportion of $N_2F_4$, e.g. 3 moles of $N_2F_4$ per 1 mole of the bis adduct, with dilution by a diluent such as $CCl_4$ or other suitable halocarbon liquids. This mixture is then heated to a temperature of 50° to 250° C. at a pressure of 450 p.s.i.g. in a stainless steel pressure bomb for a suitable period, depending on the temperature, e.g. a period of 1.5 to 15 hours or, more particularly, 150° C. for 7 hours, with mixing. In this pressure stage, the removal of the $N_2F_4$ and partially decomposed $N_2F_4$ gaseous products is effected and they are replaced by fresh $N_2F_4$ to obtain a 100% conversion of the bis-$(NF_2)$ adduct to the tetrakis-$(NF_2)$ adduct having a composition close to the theory of $C_6H_8O_2(NF_2)_4$. If the reaction is not carried out at sufficiently high temperature and pressure with fresh $N_2F_4$ and for a sufficient period of time in completing the conversion, the tetrakis adduct is contaminated by the bis-$(NF_2)$ adduct and separation procedures are then required. Under the preferred conditions given, e.g. 150° C., 7 hours of reaction under an $N_2F_4$ pressure of 450 p.s.i.g., the resulting product was practically 100% of the tetrakis-$(NF_2)$ product having the composition

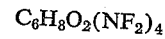

as shown in the following.

*Analysis.*—Theory for $C_6H_8O_2(NF_2)_4$: C, 22.50%; N, 17.50%; F, 47.50%. Found: C, 23.04%; N, 17.30%; F, 48.10%.

The infrared spectrum of this product was consistent with the following structural formula:

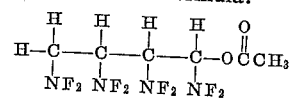

The mode of procedure in which pressure is used throughout in a pressure reactor is described in the following example.

EXAMPLE 2

The starting material was placed in the stainless steel pressure reactor with gaseous $N_2F_4$ and $CCl_4$ liquid diluent. Sufficient $N_2F_4$ was supplied to make the pressure in the reactor 450 p.s.i.g. at 150° C. The reaction mixture in the reactor was heated up to a temperature of 50° C. in a period of 60 minutes and then further heated to a higher temperature in the range of 100° to 250° C. for a period of 0.5 minute to 15 hours, varying inversely with the temperature. In carrying out the heating at the higher temperature, unreacted $N_2F_4$ and degradation products thereof were removed and replaced by fresh $N_2F_4$ gas to obtain complete conversion to the desired tetrakis-$(NF_2)$-butylacetate. This tetrakis product, after being fractionally distilled, was analyzed and found to have the composition $6_6H_8O_2(NF_2)_4$ and structure of 1,2,3,4-tetrakis-$(NF_2)$-1-acetoxybutane or which has been termed tetrakis-$(NF_2)$-butylacetate.

The tetrakis-$(NF_2)$-butylacetate product has been determined to have high energy in compounding with fuel ingredients, with other oxidizing ingredients, and binders suitable for making a solid rocket propellant grain having an Isp. in the range of 270–290. This is exemplified by the following formulation:

*Propellant composition*

| Ingredient: | Wt. percent |
|---|---|
| $C_6H_8O_2(NF_2)_4$ | 20 |
| Boron powder | 9 |
| $C_2(NO_2)_6$ | 51 |
| Polybutadiene-$NF_2$ adduct binder | 20 |

The $C_6H_8O_2(NF_2)_4$ represents the tetrakis-($NF_2$)-butyl-acetate as fluorine oxidizer which furnishes fluorine for oxidizing the powdered fuel and some of the hydrogens. The $C_2(NO_2)_6$ is hexanitroethane used as oxygen oxidizer which supplies oxygen for oxidizing carbon and which may also supply oxygen to convert the boron fuel to BOF. The polybutadiene-($NF_2$) adduct binder in the present instance is polymer having the composition of the recurring unit $C_4H_6(NF_2)_{1.7}$. The resulting solid mixture has been determined to have a combustion temperature of 4300° C. and an Isp. value of 284 seconds. The $$C_6H_8O_2(NF_2)_4$$

ingredient is thus adjudged suitable for obtaining high specific impulse (Isp.) values.

The terminal acetoxy group in the tetrakis-($NF_2$)-butyl-acetate is reactive for conversion to a hydroxyl group as, for example, by a methanolysis reaction, thus making the compound more suited for reaction with compounds having isocyanate groups or epoxide groups. The terminal acetoxy group may also be converted into other reactive functions which can link the tetrakis-($NF_2$) butyl radical to other monomeric or polymeric compounds.

What is claimed is:

1. Tetrakis-(difluoramino)-butylacetate having the composition $C_6H_8O_2(NF_2)_4$.

2. Process for the synthesis of tetrakis-($NF_2$)-butyl-acetate which comprises reacting 1-acetoxy-1,3-butadiene in vapor phase with sufficient $N_2F_4$ under subatmospheric pressure at a temperature in the range of 20° to 100° C. to form a bis-($NF_2$) adduct of the acetoxy-1,3-butadiene, reacting the resulting bis-($NF_2$) adduct of the acetoxy-butadiene with a fresh charge of $N_2F_4$ at a temperature in the range of 50° to 250° C. under superatmospheric pressure in the presence of an inert halocarbon diluent to convert the bis-($NF_2$) adduct to tetrakis-($NF_2$)-butylacetate product, and recovering said product.

3. Process for the preparation of tetrakis-($NF_2$)-butyl-acetate which comprises forming a mixture of $N_2F_4$ under superatmospheric pressure of about 1 to 10 atmospheres with 1-acetoxy-1,3-butadiene diluted with liquid $CCl_4$, heating the resulting mixture under pressure to a temperature in the range of 100° to 250° C., removing gaseous degradation products from the resulting mixture and charging fresh $N_2F_4$ to the resulting mixture for further heating of said mixture with the fresh charge of $N_2F_4$ under superatmospheric pressure to a temperature in the range of 100° to 250° C. to produce tetrakis-($NF_2$)-butyl-acetate, and recovering the resulting tetrakis-($NF_2$)-butyl-acetate product.

References Cited

UNITED STATES PATENTS 3,166,595  1/1967  Frazer _____ 260—583

OTHER REFERENCES

Hoffman et al., Chem. Reviews, vol. 62, pp. 1–18.

LORRAINE A. WEINBERGER, *Primary Examiner.*

L. D. ROSDOL, O. R. VERTIZ, *Examiners.*

J. W. WHISLER, V. GARNER, *Assistant Examiners.*